(12) United States Patent
Wesner et al.

(10) Patent No.: US 7,455,754 B2
(45) Date of Patent: Nov. 25, 2008

(54) DIAMOND ELECTRODE AND METHOD FOR PRODUCTION THEREOF

(75) Inventors: Wolfgang Wesner, Vienna (AT); Robert Hermann, Bruck/Mur (AT); Michael Schelch, Graz (AT); Michael Kotschan, Leoben (AT); Wolfgang Staber, Bruck/Mur (AT)

(73) Assignee: Pro Aqua Diamantelektroden Produktion GmbH & Co KEG, Niklasdorf (AT)

( * ) Notice: Subject to any disclaimer, the term of this patent is extended or adjusted under 35 U.S.C. 154(b) by 365 days.

(21) Appl. No.: 10/520,930

(22) PCT Filed: Mar. 25, 2003

(86) PCT No.: PCT/EP03/03085

§ 371 (c)(1),
(2), (4) Date: Jan. 17, 2006

(87) PCT Pub. No.: WO2004/005585

PCT Pub. Date: Jan. 15, 2004

(65) Prior Publication Data

US 2006/0151803 A1    Jul. 13, 2006

(30) Foreign Application Priority Data

Jul. 8, 2002    (AT)    ................... A 1018/02

(51) Int. Cl.
*C25B 11/12*    (2006.01)
(52) U.S. Cl. ............. 204/294; 204/290.15; 204/290.01; 204/280; 427/77; 427/249.8; 313/309; 313/355; 428/621; 428/634; 445/50

(58) Field of Classification Search ................. 204/294, 204/280, 290.01, 290.15; 427/77, 249.8; 313/309, 355; 445/50; 428/621, 634
See application file for complete search history.

(56) References Cited

U.S. PATENT DOCUMENTS

| 5,139,970 | A | 8/1992 | Yamazaki |
| 5,977,697 | A | 11/1999 | Kochanski |
| 6,267,866 | B1 | 7/2001 | Glesener et al. |
| 2002/0029977 | A1 | 3/2002 | Natishan et al. |
| 2005/0186345 | A1* | 8/2005 | Shibata et al. ........... 427/249.7 |

FOREIGN PATENT DOCUMENTS

| DE | 198 42 396 | 4/2000 |
| DE | 199 48 184 | 5/2001 |
| DE | 100 25 167 | 12/2001 |
| EP | 0 333 048 B1 | 9/1989 |
| EP | 1 036 861 A | 9/2000 |
| JP | 2000-045097 | 2/2000 |

OTHER PUBLICATIONS

Database WPI, Week 9719, Derwent Publications Ltd., London, GB, AN 1997-203664, Dec. 1994.

* cited by examiner

*Primary Examiner*—Bruce F Bell
(74) *Attorney, Agent, or Firm*—Flynn, Thiel, Boutell & Tanis, P.C.

(57) ABSTRACT

The invention relates to a diamond electrode with synthetically produced, electrically conductive (doped) diamonds. The surface has diamond particles (5) embedded in a metal or metal alloy layer so as to produce a conductive connection to the metal or metal alloy.

36 Claims, 1 Drawing Sheet

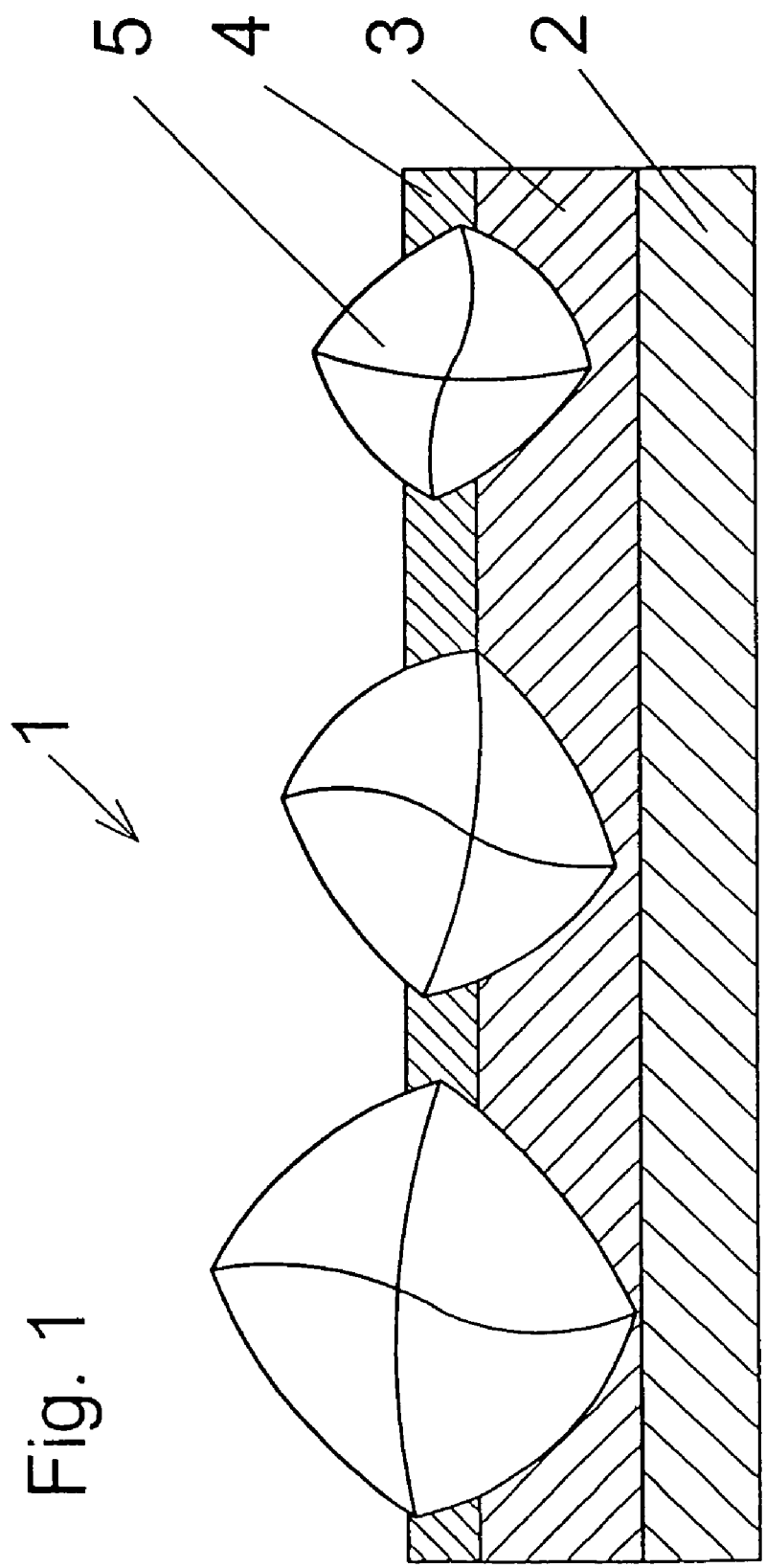

DIAMOND ELECTRODE AND METHOD FOR PRODUCTION THEREOF

FIELD OF THE INVENTION

The invention relates to a diamond electrode with synthetically produced and electrically conductive (doped) diamonds and to processes for producing it.

BACKGROUND OF THE INVENTION

Diamond electrodes are distinguished by their high overvoltage for oxygen and hydrogen and are therefore particularly suitable for a wide range of oxidation processes in aqueous solution. Therefore, possible and particularly interesting applications would be in the field of drinking water treatment (disinfection) and water treatment by anodic oxidation. Further applications include electrochemical synthesis, in particular the production of oxidizing agents, and electrolysis of water and the electrochemical production of ozone and chlorine.

Currently, diamond electrodes are produced by direct generation of boron-doped diamond layers on substrate materials, in particular by CVD (chemical vapor deposition) processes. The known techniques differ from one another in particular with regard to the way in which the energy is introduced. In the case of what is known as hot-filament technology, tungsten wires are heated in a gas mixture of hydrogen, a carbon source and a boron source above a substrate. In this context, it is possible to use various substrates which in the CVD process differ in particular with regard to their different carbon solubility.

In practice, only copper and gold are inert. Titanium, zirconium, hafnium, niobium, tantalum, chromium, molybdenum, tungsten and silicon form carbide layers during the coating, which have to reach a certain material-specific thickness (a few nm in the case Si, a few μm in the case of Ti) before nucleation and therefore diamond deposition occurs. Even longer starting times during the CVD deposition occur with substrates which dissolve carbon, such as iron, cobalt, nickel, platinum and palladium. At the same time, during the coating reactions occur with the atomic hydrogen and carbon, forming carbide interlayers ($SiO_2$, $ZrO_2$). For these reasons, not all metals are equally suitable for coating.

When used as electrodes, it has emerged that various substrate materials which have a low oxygen overvoltage when connected as anode have an insufficiently long service life. If fine cracks are formed in the diamond layer, electrolysis oxygen is immediately formed, and this causes the diamond layer to become detached.

Boron-doped diamond layers produced using microwave plasma (MPCVD) can also be produced without a substrate, so that pure diamond electrodes of very high quality can be produced. To ensure a certain mechanical stability, electrodes of this type have to be produced in a relatively great layer thickness, which causes very high production costs and prevents economic use of this technology.

The invention is based on the object of providing and/or developing diamond electrodes and processes for producing diamond electrodes which make it possible to enable diamond electrodes to be produced at an economically acceptable outlay and accordingly at low cost. Therefore, the intention is for economic use of diamond electrodes to be possible for the first time in a wide range of oxidation processes in aqueous solution. In particular, correspondingly large-area electrodes should be producible, these electrodes being suitable in particular for drinking water treatment or wastewater treatment and/or electrochemical synthesis.

SUMMARY OF THE INVENTION

This object is achieved by a diamond electrode designed in accordance with the invention, which has doped diamond particles embedded in the surface of a metal or metal alloy layer so as to produce an electrically conductive connection to the metal or metal alloy.

In a process according to the invention for producing diamond electrodes, a powder formed from doped, synthetically produced diamonds is embedded at least in the surface of a metal or a metal alloy, in such a manner as to produce an electrically conductive connection between the metal or metal alloy and the diamond particles.

Therefore, the invention is based on using diamond powder produced on an industrial scale and therefore at relatively low cost as starting material and connecting it to a metal or a metal alloy so as to produce an electrically conductive connection between the metal and the diamond particles in the form of a diamond electrode. It is known to use industrially produced diamond powder for various intended applications, for example for abrasive pastes. This diamond powder can also be produced in doped form using one of the standard processes, for example by high-pressure, high-temperature processes using metal catalysts. With these production techniques, the diamond powder can be made conductive by introducing boron, for example, in the production process.

In the case of an electrode designed in accordance with the invention, the locations which are left between the diamond particles at the surface of the electrode are provided with a nonconductive oxide layer and are thereby passivated. This ensures that the conductivity of the diamond particles is higher than that of the embedding material and it is impossible for any uncovered metal surfaces to react with the electrolyte solution. In addition, these locations may be provided with a sealing layer, for example a silicate layer.

In one preferred embodiment of the invention, the embedding layer is applied to a layer of substrate material which consists in particular of a metal passivated by oxides or includes such a metal as an alloying constituent or coating. Therefore, by way of example, titanium or aluminum and alloys of these metals are suitable. If a mechanically stable material is used for the substrate material, this material can also be used for contact-connection of the electrode. In the case of embodiments of the electrode in which the substrate layer is coated on both sides, or if the rear side is insulated, it is also possible to use other materials (iron, steel, nonferrous metals, etc.), but also nonconductors.

The embedding layer at least partially comprises elements which are able to form nonconductive oxides. Therefore, inter alia metals or metal alloys selected from the group consisting of magnesium, aluminum, titanium, yttrium, zirconium, hafnium, tantalum, vanadium and zinc are suitable.

The diamond powder which has been embedded in the surface of the embedding layer is doped in particular with boron, phosphorus or nitrogen and has a grain size of the order of magnitude of 1 to 700 μm, in particular up to 200 μm. It is advantageous to use a diamond powder with at least substantially coinciding grain sizes.

In a first variant of the process in accordance with the invention, the doped diamond particles are introduced directly into a substrate material, which contains at least one element which is able to form a nonconductive oxide layer, by mechanical forces and/or the action of temperature. This allows inexpensive and rapid production of diamond electrodes.

One possible way of introducing them by applying mechanical forces consists in the diamond particles being pressed or rolled into the surface of the substrate material.

Another alternative of the process according to the invention consists in accelerating the doped diamond particles in fluids and thereby introducing them into the surface when they strike the latter. This process too is inexpensive and allows simple production of the diamond electrode. Examples of suitable fluids include water or air, and the acceleration can be effected by means of pumps or compressors.

In a further alternative of the process according to the invention, the doped diamond particles are mixed with metal or metal alloys which are able to form a nonconductive oxide layer and pressed, so as to produce a pressed part, if appropriate with support plate, which includes the doped diamond particles enclosed in one or more layers. The result, therefore, is an electrode having a plurality of layers of doped diamond particles, so that the ability of the electrode to function is fully retained even in the event of a certain amount of wear to the latter.

Yet another variant of the process in accordance with the invention consists in sintering the doped diamond particles onto substrate materials. The advantage of this process resides in the production of a particularly stable connection between the diamond particles and the substrate material.

In a further process, the metals or metal alloys are deposited from the vapor phase.

In accordance with the invention, low-melting materials, for example magnesium or a magnesium alloy, which are melted onto an in particular metallic substrate layer with a higher melting point, can be used as starting material for the embedding layer, the diamond powder already having been mixed with the powder of the alloy or then being applied to the still liquid metal and finally being cooled.

Yet another variant of the process in accordance with the invention provides for a metal or a metal alloy with diamond powder to be deposited by electroplating, with an aqueous solution or a molten salt, in which the diamond powder is held in suspension by stirring or the like and being incorporated in the deposited metal, being used.

In accordance with the invention, the diamond electrodes produced using these processes can be used as starting product for further deposition of doped diamond using conventional processes, in particular CVD and DVD processes.

Conductive metals or metal alloys, which at least partially comprise at least one element which is able to form nonconductive oxides, such as magnesium, aluminum, titanium, yttrium, zirconium, hafnium, tantalum, vanadium or zinc, can be used for the embedding layer and/or the substrate material.

In the processes according to the invention, the metal surfaces or locations which remain clear between the diamond particles are passivated. This ensures that the conductivity of the diamond particles is greater than that of the embedding material.

The passivation is effected in particular by producing an oxide layer by means of anodic or chemical oxidation.

In this case, the anodic oxidation can be carried out by direct current, pulsed direct current or alternating current with the anodic phase period dominating. It is simplest to use direct current. Pulsed direct current allows improved delivery of peroxide forming agents (sulfate, borate) and therefore complete oxidation, on account of the pauses, in which diffusion but no reaction takes place. If alternating current is used, the anodic phase is interrupted by a brief cathodic phase, with the result that the oxidizing agents are destroyed. They are then reformed in the next anodic phase. This makes it possible to prevent oxidizing agents from penetrating deep into the pores and excessively deep oxidation from occurring. Therefore, a defined layer thickness can be oxidized without the layers beneath it suffering.

In particular aqueous solutions which contain borate, sulfate, phosphate and fluoride ions in combination are used to carry out the anodic oxidation. It is in this way possible to produce particularly wear-resistant and corrosion-resistant protective layers or oxidation layers.

In a further preferred variant embodiment of the process, the oxidation solutions are buffered. This prevents the solutions from becoming basic and hydroxides, which are water-soluble, also being formed instead of oxides.

The pores in the oxide layer may additionally be sealed. This increases the mechanical strength and improves the insulation properties. In this context, it is particularly suitable for the surface of the oxide layer to be subsequently treated with an aqueous silicate which is hardened under air rich in carbon dioxide.

Alternatively, sealing can also be achieved by the surface being transformed by the penetration of dissolved metal salts with or without applied potential, into a layer with ceramic properties. A treatment of the surface of this type can also take place prior to a silicate treatment. In this case, the ceramic properties can be improved still further in a subsequent sintering process. The term ceramic properties relates to the stable crystal structures which are formed. The sintering process is carried out after the additional metals have been introduced into the oxide layer, with the material being held at a temperature around the melting point of the alloy used for a prolonged period of time, for example for several hours. The elevated temperature results in mobility of molecules, which allows the formation of more stable modifications. In this way, the density, the mechanical strength and the thermal stability of the layer can be improved.

A further variant according to the invention of the process consists in the doped diamond particles being introduced into the surface of coated substrate materials, in particular coated with Teflon. The Teflon layer makes it very easy for the gases which are formed when the electrode is used to be released from the surface of the electrode.

Diamond electrodes produced in this way can be used in particular for the production of gases, in particular of ozone and/or oxygen.

The processes according to the invention can be used to process diamond powder with a very wide range of grain sizes and from various production processes to form electrodes. In this context, it is particularly advantageous to use conductive diamond powder which has a grain size of from 1 to 700 μm, in particular up to 200 μm. The doping is preferably carried out with boron, phosphorus or nitrogen.

BRIEF DESCRIPTION OF THE DRAWINGS

Further features, advantages and details of the invention will now be described in more detail with reference to the drawing, the only FIGURE of which diagrammatically depicts a cross section through an electrode designed in accordance with the invention.

DETAILED DESCRIPTION OF THE INVENTION

The diagrammatic embodiment of an electrode 1 designed in accordance with the invention as shown in the FIGURE of the drawing comprises a layer 2 of a substrate material, a metallic embedding layer 3 for diamond particles 5 which project outward above the layer 3, and an oxide layer 4 which passivates and seals the embedding layer 3 between the individual diamond particles 5.

In particular a suitably mechanically stable material is used as material for the substrate layer 2 and can preferably also be employed for contact-connection of the electrode. In the case of the single-side coating of the substrate material as shown, it is preferable to use a material which can form a nonconductive oxide layer. An example of a typical, particularly suitable material is titanium sheet. The embedding layer 3 consists of an oxide-forming metal or an oxide-forming metal alloy. In particular magnesium alloys, but also alloys which at least partially comprise elements which are able to form nonconductive oxides, such as, are particularly suitable for the embedding layer. Oxide layer 4 which is provided and required between the partially embedded diamond particles 5 can be produced by means of anodic or chemical oxidation of the embedding layer 3. In the event of any mechanical damage to the electrode, this oxide layer, when connected as anode, is self-regenerating.

A conductive diamond powder, for example a diamond powder doped with boron, phosphorus or nitrogen, is used to produce an electrode 1 constructed in accordance with the invention. The conductive diamond powder does not in this case form the subject matter of the invention, and in this context it is possible to employ industrially produced diamond powder. Various processes are suitable for embedding the diamond powder in the conductive material and for forming the embedding layer 3.

By way of example, the diamond particles can be introduced directly into a substrate material, which contains at least one element which is able to form a nonconductive oxide layer, by mechanical forces and/or the action of temperature. These processes make use of the extreme hardness of the doped diamond particles. The doped diamond particles can be pressed or rolled into the surface of the substrate material in this case.

In another, similar process, the doped diamond particles are accelerated by application of energy in fluids, for example in air, water or an air fluid stream and the like, in order for them to impact on the substrate material at high velocity and to be introduced into the surface.

A further process which is eminently suitable for producing electrodes designed in accordance with the invention consists in metal or metal alloys which are able to form a nonconductive oxide layer being mixed with the doped diamond particles and then pressed, so that a pressed part, which if appropriate is applied to a support plate, is formed, this pressed part containing the diamond particles embedded in one or more layers. Embodiments of this type have the advantage that in the event of wear new layers of diamond particles gradually reach the surface, so that the electrode surface can, as it were, be renewed.

A further method which is eminently suitable for producing electrodes designed in accordance with the invention consists in the fact that the doped diamond particles are sintered to a substrate material.

Yet another method which is eminently suitable for producing electrodes designed in accordance with the invention and is used to apply the metals or metal alloys consists in depositing these metals or metal alloys from a saturated vapor phase. In this process, by way of example, a substrate material is cooled and introduced into an in particular oxygen-free atmosphere (vacuum). Liquid metal or liquid metal alloys are located in the sublimation chamber. Depending on the metal or metal alloy, the chamber is heated, for example, to 100 to 1500° C. The deposition is effected by the direct cooling of the vapor phase at the substrate material, with the doped diamond particles also being included.

Low-melting starting materials for the embedding layer 3, for example magnesium and magnesium alloys, can be melted directly, in particular onto a metallic substrate material having a higher melting point, for example titanium sheet. This takes place under a protective argon atmosphere and if appropriate at a reduced pressure. The diamond powder is applied to the liquefied metal, for example by being sprinkled onto it, and is cooled.

Another possible way of embedding the diamond powder and forming the embedding layer 3 consists in co-deposition of a metal or a metal alloy with diamond powder by electroplating from aqueous solution, for example a zinc solution or from a molten salt, for example titanium from a molten alkali metal salt. The diamond powder is in this case held in suspension by stirring and is thereby embedded randomly, as it were, into the deposited metal.

Moreover, the diamond electrodes produced in accordance with the above processes can be used as starting product for further deposition of doped diamonds using conventional processes, in particular CVD and PVD processes.

The locations which remain between the individual diamond particles 5 are locations with uncovered metal surfaces of the embedding layer 3, which would react with the solution. Therefore, they are passivated, so that currents transfer is effected exclusively or predominantly through the diamond particles 5. An aqueous electrolyte bath with contains corresponding oxidizing agents and/or peroxide-forming agents can be used for the oxidation process. If the embedding layer 3 consists of or contains magnesium, to produce a particularly corrosion-resistant and wear-resistant protective layer by anodic oxidation it is possible to use an electrolyte bath which, in accordance with EP-B1 0 333 048, contains 10 to 80 g per liter of borate or sulfate ions, 10 to 70 g per liter of phosphate ions and 5 to 35 g per liter of fluoride ions and less than 100 g per liter of alkali metal ions and which is set to a pH of from 5 to 11, preferably 7 to 9. In this case, direct current with a rising voltage up to 400 volts is used and the direct current is briefly interrupted or its polarity reversed. For further details on the execution of this known process, reference is made to the abovementioned patent.

Further anions and/or cations which promote the formation of dense ceramic layers, such as for example aluminum salts, can be incorporated into the oxide layer which is formed during the oxidation process. In particular salts which improve the mechanical strength and the insulation properties are used. Chemical oxidation is also possible as an alternative to anodic oxidation.

The mechanical strength and/or the insulation properties can be improved by sealing the oxide layer, for example by means of aqueous alkali metal silicate solutions, which precipitates with carbon dioxide as a weak acid in the pores. The hardening can be carried out in air which is rich in carbon dioxide. Beforehand or as an alternative, the entire surface of the electrode can be transformed by the penetration of dissolved metal salts, such as for example aluminum salts, with or without applied potential, into a layer having ceramic properties. The ceramic properties can be improved still further by a subsequent sintering process.

One typical form of the insulation layer corresponds to a technical-grade ceramic, such as cordierite ($Mg_2Al_4Si_2O_{12}$). Cordierite is an aluminium-magnesium silicate which the materials groups C 410 and C 511, C 512 and C 520 are based. They are distinguished by particularly low thermal expansion and consequently a very high resistance to cylical temperature loads. These properties are used for the very well-known applications as automobile catalyst supports and also as high-quality heat-resistant domestic crockery. Further forms are based on ceramic techniques which rely on the use of sintered corundum ($Al_2O_3$) or yttrium oxide ($Y_2O_3$). With regard to the chemical stability of the electrodes in various media, the ceramics can be tailored to the particular intended application by means of specific element compositions.

Sealing of the oxide layer can also be achieved by applying elements which can be evaporation-coated onto the surface, in particular elements which are suitable for forming a nonconductive oxide layer.

Alternatively, sealing can be achieved by a subsequent CVD or PVD process, with an additional layer of doped diamond particles being applied to the doped diamond particles which have been introduced into the surface. The problems with carbide formation in the base which are known in connection with the methods for producing diamond electrodes that have hitherto been customary are in this case largely avoided. The coating duration and the associated energy consumption are drastically reduced on account of the use of electrodes which have been produced using processes according to the invention.

Since the materials used for the embedding layer are at least in some cases metals which are able to form a nonconductive oxide layer, a certain self-healing effect is possible in the event of mechanical damage to the electrode surface. This is expedient in particular if the electrode in use is connected as an anode, as would be the case during anodic oxidation or drinking water disinfection.

It is also possible to use processes for producing diamond electrodes according to the invention which do not require subsequent passivation of the surfaces. This is the case, for example, if the doped diamond particles are introduced into the surface of correspondingly coated substrate materials, for example coated with Teflon. Diamond electrodes produced in this manner are eminently suitable in particular for the production of gases, in particular of ozone and/or oxygen.

Finally, it should also be mentioned that there is no need to provide a substrate layer. If such a layer is provided, it can also be provided on both sides with an embedding layer having diamond particles.

The invention claimed is:

1. A diamond electrode comprising synthetically produced, electrically conductive (doped) diamonds, wherein diamond particles are embedded in the surface of a metal or metal alloy layer so as to produce a conductive connection to the metal or metal alloy.

2. The diamond electrode as claimed in claim 1, wherein the locations which are left between the diamond particles at the surface of the electrode are provided with a nonconductive oxide layer and are thereby passivated.

3. The diamond electrode as claimed in claim 2, wherein the nonconductive oxide layer is covered with a sealing layer, for example a silicate layer.

4. The diamond electrode as claimed in claim 1, wherein the embedding layer is applied to a layer of substrate material.

5. The diamond electrode as claimed in claim 4, wherein the layer of substrate material consists of metals or metal alloys passivated by oxides, in particular of titanium, aluminum or of alloys of these metals.

6. The diamond electrode as claimed in claim 4, wherein the layer of substrate material is insulated on its rear side.

7. The diamond electrode as claimed in claim 4, wherein the layer of substrate material is provided on both sides with a diamond layer with embedded diamond particles.

8. The diamond electrode as claimed in claim 1, wherein the embedding layer at least partially comprises elements which are able to form nonconductive oxides.

9. The diamond electrode as claimed in claim 8, wherein the embedding layer contains at least one metal selected from the group consisting of magnesium, aluminum, titanium, yttrium, zirconium, hafnium, tantalum, vanadium and zinc.

10. The diamond electrode as claimed in claim 1, wherein the diamond particles embedded in the surface of the embedding layer are doped in particular with boron, phosphorus or nitrogen.

11. The diamond electrode as claimed in claim 1, wherein the grain size of the diamond particles is between 1 and 700 µm.

12. The process as claimed in claim 11, wherein the grain size of the diamond particles is up to 200 µm.

13. The diamond electrode as claimed in claim 1, wherein the grain sizes of the embedded diamond particles substantially coincide with one another.

14. A process for producing a diamond electrode, wherein a powder formed from doped, electrically conductive, synthetically produced diamonds is embedded at least in the surface of a metal or a metal alloy, in such a manner as to produce a conductive connection between the metal or metal alloy and the diamond particles.

15. The process as claimed in claim 14, wherein the doped diamond particles are introduced directly into a substrate material, which contains at least one element which is able to form a nonconductive oxide layer, by mechanical forces and/or the action of temperature.

16. The process as claimed in claim 15, wherein the doped diamond particles are pressed or rolled into the surface of the substrate material.

17. The process as claimed in claim 15, wherein the doped diamond particles are accelerated in fluids and are thereby introduced into the surface when they strike the latter.

18. The process as claimed in claim 14, wherein the doped diamond particles are mixed with powders of metals or metal alloys which are able to form a nonconductive oxide layer and pressed, so that a pressed part, if appropriate with support plate, is formed, this pressed part containing the diamond particles embedded in one or more layers.

19. The process as claimed in claim 14, wherein the doped diamond particles are sintered onto a substrate material.

20. The process as claimed in claim 14, wherein the metals or metal alloys are deposited from the vapor phase.

21. The process as claimed in claim 14, wherein low-melting materials, for example magnesium or a magnesium alloy, which are melted on an in particular metallic substrate layer with a higher melting point, are used as starting material for the embedding layer, the diamond powder already having been mixed with the powder of the alloy or then being applied to the still liquid metal and finally being cooled.

22. The process as claimed in claim 14, wherein a metal or a metal alloy with diamond powder is deposited by electroplating, with an aqueous solution or a molten salt, in which the diamond powder is held suspension by stirring or the like and is thereby incorporated into the deposited metal, is used.

23. The process as claimed in claim 14, wherein conductive metals or metal alloys, which at least partially comprise at least one element which is able to form nonconductive oxides, such as magnesium, aluminum, titanium, yttrium, zirconium, hafnium, tantalum, vanadium or zinc are used for the embedding layer and/or the substrate material.

24. The process as claimed in claim 14, wherein the metal surfaces or locations which remain clear between the diamond particles (5) are passivated.

25. The process as claimed in claim 24, wherein an oxide layer is produced by means of anodic or chemical oxidation for passivation purposes.

26. The process as claimed in claim 25, wherein the anodic oxidation is carried out by direct current, pulsed direct current or alternating current with the anodic phase period dominating.

27. The process as claimed in claim 25, wherein in particular aqueous solutions which contain borate, sulfate, phosphate and fluoride ions in combination are used to carry out the anodic oxidation.

28. The process as claimed in claim 24, wherein the oxidation solutions are buffered.

29. The process as claimed in claim 24, wherein the oxide layer is sealed.

30. The process as claimed in claim 29, wherein the oxide layer is subsequently treated with an aqueous silicate which is hardened under air rich in carbon dioxide.

31. The process as claimed in claim 29, wherein the surface is transformed by the penetration of dissolved metal salts, with or without applied potential, into a layer having properties of a technical-grade ceramic, such as cordierite or sintered corundum.

32. The process as claimed in claim 14, wherein the doped conductive diamond particles are introduced into the surface of coated substrate materials, in particular coated with Teflon.

33. The process as claimed in claim 14, wherein the particles of the diamond powder have a grain size of from 1 to 700 μm.

34. The process as claimed in claim 14, wherein the particles of the diamond powder are doped with boron, phosphorus or nitrogen.

35. The process as claimed in claim 14, wherein the particles of the diamond powder have grain sizes at least substantially coinciding with one another.

36. The process as claimed in claim 33, wherein the particles of the diamond powder have a grain size of up to 200 μm.

* * * * *